Patented Aug. 12, 1924.

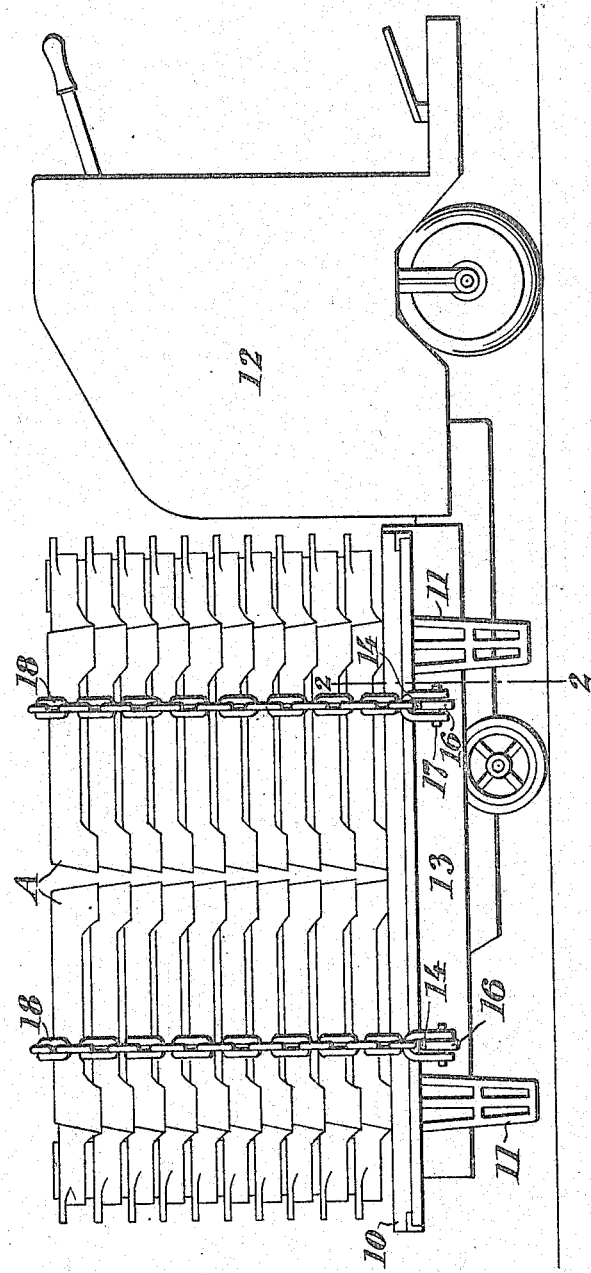

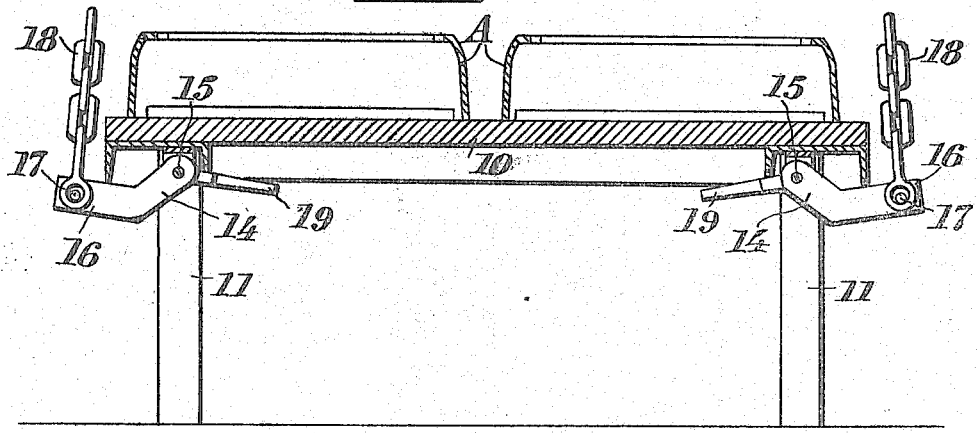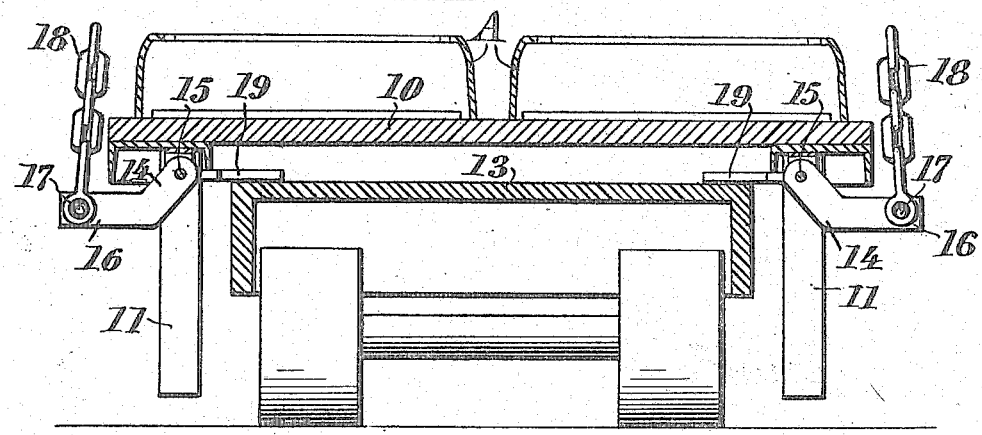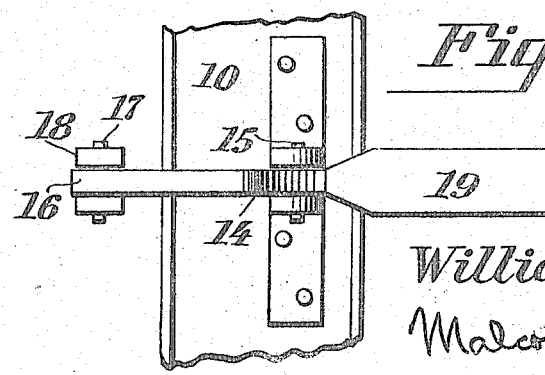

1,504,285

UNITED STATES PATENT OFFICE.

WILLIAM H. TAYLOR, OF ST. JOHNSBURY, VERMONT, ASSIGNOR TO E. AND T. FAIRBANKS AND COMPANY, OF ST. JOHNSBURY, VERMONT, A CORPORATION OF VERMONT.

LOAD-TIGHTENING MEANS.

Application filed October 29, 1923. Serial No. 671,621.

*To all whom it may concern:*

Be it known that I, WILLIAM H. TAYLOR, a citizen of the United States, residing at St. Johnsbury, in the county of Caledonia and State of Vermont, have invented new and useful Improvements in Load-Tightening Means, of which the following is a specification.

This invention relates to load tightening means for trucks or other vehicles, and more particularly it contemplates an improved means useful in connection with service trucks in industrial establishments, whereby large loads may be transported by motor, and other types of vehicles, from one part of a factory to another.

The prime object of my invention is to provide a load tightening means so constructed that the binder element used to retain the load in position, will be automatically tightened, and all slack occasioned by the vibration of the load will be automatically taken up when the load is being moved.

Another object of my invention is to provide means whereby part of the load may be discharged at different locations, and the balance be as easily and as quickly secured as the original load.

My invention further consists in the construction, arrangement, and combination of the various parts of which it is composed, as will be hereinafter described and claimed.

For the purpose of illustration, reference is had to the accompanying drawings in which,—

Figure 1, is a side view of a loaded skid and transporting truck, showing my invention applied to the skid, and the platform of the truck elevated;

Fig. 2, is a transverse section taken on the line 2—2, of Fig. 1, the parts being shown in the position they assume before the truck platform is inserted beneath the skid and raised;

Fig. 3, is a view similar to Fig. 2, the parts being shown in the position they assume when the platform of the truck is inserted beneath the skid and raised, and Fig. 4, is an enlarged detail plan view of a portion of the device.

Obviously my invention is applicable to many uses, but in order to describe in detail an embodiment thereof which has proven meritorious in actual practice, I will first explain that it is common practice in industrial establishments where loads of unit parts, such as is shown by A, Fig. 1, are to be transported in quantities from one part of the establishment to another, that these units are piled or stacked to a considerable height upon a super-truck platform, or skid 10, as it is usually termed, which skid is supported above the floor by legs 11. A large number of skids may be loaded at a given point in readiness for hauling away.

A truck, such as that indicated by the numeral 12, which can be used for transporting the skids, is usually provided with a projecting platform 13, that is capable of being raised and lowered. Thus, when a skid is to be moved, the projecting platform of the truck is run under the platform of the skid, and the skid with its load raised from the floor, and then hauled away.

When a skid is loaded, it usually rests without movement upon a firm foundation, and therefore the load can be piled to a considerable height. However, when the skid is moved, the load is apt to be tipped or shaken off, unless it is securely bound or strapped thereto.

Heretofore, this securing of a load to a skid has been a difficult and laborious process, that consumed considerable time. Even then the motion or vibration caused by hauling frequently dislodged the load, thereby loosening the binding elements, with a consequent toppling of the load, unless it was rebound or supported by men on either side.

By my invention, each side of the skid is provided with levers 14, that are pivoted, as at 15, to the underside of the marginal edge of the skid, as shown. Each of the levers is provided with an outwardly extending portion 16, which may be off-set as shown, and the extremity of this portion of each lever carries a pin 17, to which is attached one end of a binding element, such as a chain 18, or the like. Any approved means may be used for attaching the chain 18 to the end of the levers 14. Each lever is also provided with an inwardly projecting flattened portion 19, the purpose of which is to provide a bearing surface, against which the platform 13 contacts when the skid is being transported. By preference, the levers are arranged in pairs along opposite sides of the skid, whereby the binding element 18 may be passed over the load and be attached to the pins 17 in the manner shown.

The construction of the levers is such that, after the binding element has been passed around the load upon the skid, and secured to the extremities of the levers, the inwardly projecting portions 19 will be inclined downwardly at an angle and such portions will also be disposed above the platform 13 of the truck, when such platform is raised, to the position shown by Figs. 1 and 3, it will, on contacting with the portions 19, swing the levers, and thus cause the outer ends thereof to move downwardly, and this action will pull the binding elements 18 taut to such extent that the load will be firmly retained in position on the skid while such skid is being transported.

Should it be desired to remove a portion of the load, the platform 13 of the truck is first lowered to relieve the tension of the binding elements 18, and then one end of such elements is uncoupled from the levers. Any number of pieces A in the load may now be removed. The remaining load is now secured in place by drawing the binding element over the load as tight as possible, and fastening it to the lever in the manner shown.

Since certain changes may be made in the above construction, and different embodiments of the invention could be made without departing from the scope thereof, it is intended that all matter contained in the above description or shown in the accompanying drawings shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

Having thus described my invention, what I claim is:—

Load tightening means comprising in combination, levers pivoted to a load receiving member, a binder element passed over the load on said receiving member and attached to said levers, and means for raising said platform and engaging said levers to tighten said binder element.

In testimony whereof I have hereunto signed my name.

WILLIAM H. TAYLOR.